Figure 1:
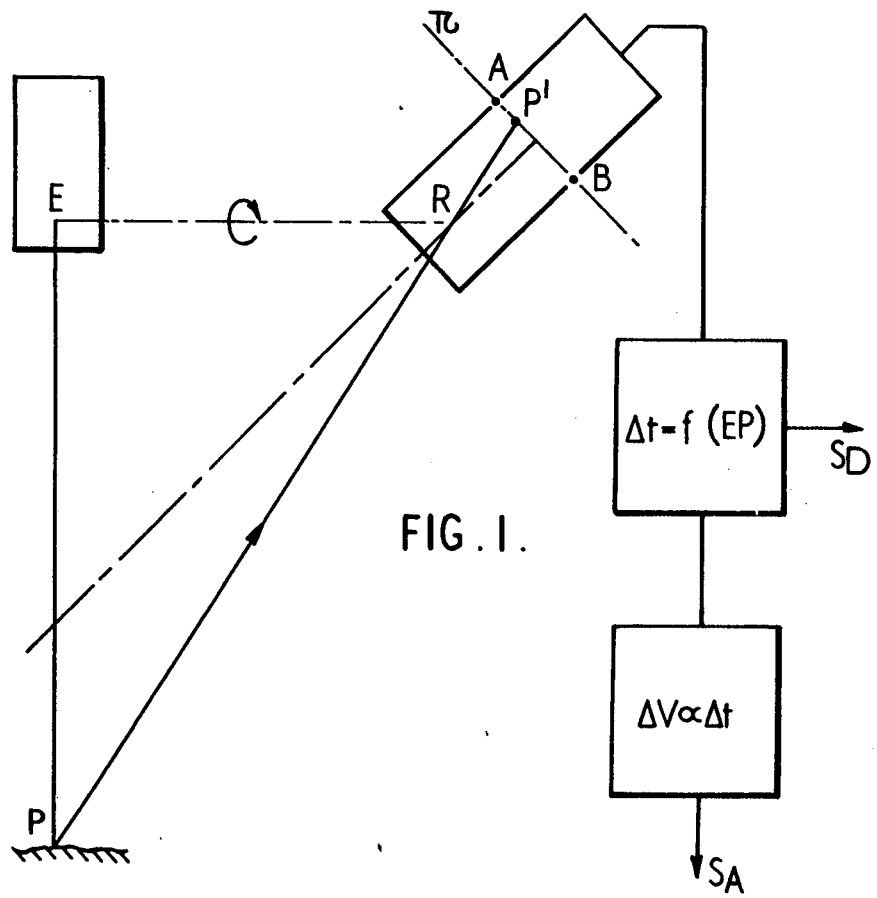

United States Patent

[11] 3,610,754

| [72] | Inventor | Robert Alfred Pirlet<br>Angleur, Belgium |
|---|---|---|
| [21] | Appl. No. | 777,752 |
| [22] | Filed | Nov. 21, 1968 |
| [45] | Patented | Oct. 5, 1971 |
| [73] | Assignee | Centre National De Recherches<br>Metallurgiques<br>Brussels, Belgium |
| [32] | Priority | Nov. 24, 1967 |
| [33] | | Belgium |
| [31] | | 707,075 |

[54] METHOD FOR DETERMINING DISTANCES
9 Claims, 2 Drawing Figs.

[52] U.S. Cl. .................................................. 356/1,
356/5
[51] Int. Cl. ...................................................... G01c 3/08
[50] Field of Search ........................................... 343/15;
356/1, 4, 5

[56] References Cited
UNITED STATES PATENTS

| 3,409,368 | 11/1968 | Fernandez..................... | 356/5 |
| 2,996,946 | 8/1961 | Brenholdt..................... | 356/5 |

Primary Examiner—Rodney D. Bennett, Jr.
Assistant Examiner—Joseph G. Baxter
Attorney—Holman & Stern ABSTRACT: The invention is a method for determining distances and in particular for determining the profile of a surface. A ray of electromagnetic radiation is directed from a given emission point on to the surface whose profile is to be determined. A television camera, whose optical axis is fixed in relation to the axis of emission, is arranged at a reception point which is fixed in relation to the emission point. A ray reflected by the surface is collected by the camera. The position of the axis of emission is measured while the position of the image on the sensitive surface of the camera is recorded by carrying out a single time count. The distance of the surface from the point of emission is computed from this time count.

INVENTOR
ROBERT ALFRED
PIRLET

METHOD FOR DETERMINING DISTANCES

The present invention relates to a method for determining distances by optical means, and is particularly concerned with cases in which the distances define positions of points forming part of some surface, which is poorly lighted or not lighted at all, such as for instance the upper surface of the charge of a shaft furnace, since by this method it is possible in particular to determine the profile of the said charge.

There are at present numerous methods for the determination of distances by means of a telemetric device comprising a television camera as observation equipment, and very satisfactory results have been obtained using the method described below.

From a given point, called the emission point, an electromagnetic radiation is directed onto the surface the profile of which one wishes to determine. At another point, called the reception point, which is fixed in relation to the emission point, a television camera is arranged. The optical axis of the camera is fixed in relation to the straight line connecting the point of emission and of reception, and whose solid observation angle embraces the entire surface to be observed. By means of the said television camera the rays reflected by the said surface are collected, while in accordance with a prearranged law the orientation of the axis of emission is changed, which makes it possible to determine, from the image obtained, the profile of the surface corresponding to the law of variation of orientation of the axis of emission.

It should be noted that this method involves the counting of lines and counting on one and the same line to determine the angle and the distance defining the position of each point. This double electronic counting has the disadvantage of being expensive, since it is necessary to have available two separate counters.

The aim of the present invention is to produce an analogous method by which it is possible to overcome this disadvantage.

The method of the invention, in which from a given point of emission a beam of electromagnetic radiation is directed onto the surface the profile of which is to be determined, is essentially characterized in that at a point of reception, fixed in relation to the point of emission, a television camera is arranged, the optical axis of which is fixed in relation to the axis of emission; by means of the said television camera rays reflected by the surface whose profile one wishes to determine are collected; and the position of the image on the sensitive surface of the camera is recorded by carrying out a single time count.

In accordance with the invention, the digital signal obtained from the time count is converted into a continuous analog signal, which is connected to the distance of the surface from the point of emission by a predetermined law governed by the geometry of the arrangement.

Also in accordance with the invention, the continuous analog signal may be introduced into an analog computer adapter to supply a continuous signal which is proportional to the distance of the surface from the point of emission.

The solid angle of observation of the television camera is advantageously an acute angle, whose largest dimension is located in the plane formed by the emitter axis and the optical center of the camera, or in a parallel plane, which makes it possible to reduce the reception of extraneous luminous flux.

In order to have high emission of radiation and accuracy of direction, use is advantageously made, as emitter apparatus, of a laser, and in particular a pulse laser.

For the purpose of eliminating the actual radiation originating from the surface, use is made of a very selective interference filter in association with the receiver.

It should be noted that if use is made of a continuous emission laser, the time counting intended for the recording of the position of the image on the receiver can be either a line counting or counting on a single line. On the other hand, if a pulse laser is used, the time counting is preferably counting on a single line, given the brevity of the said pulses.

If the source of emission is a pulse laser, the release of the pulse is advantageously synchronized in relation to the line synchronizing pulse of the line on which the time counting, intended for the recording of the position of the image, is to be carried out. This method is advantageous, since it makes it possible to utilize the maximum of energy emitted during the scanning of the other lines.

It is furthermore possible in accordance with the invention to carry out a time counting between a given signal, suitably selected, and the image signal.

This given signal can be wither a permanent reference image formed on the sensitive surface of the camera, or the frame synchronization signal.

The invention will be further described with reference to the accompanying drawing which illustrates an embodiment of the invention but in no restrictive sense.

Figure 2:
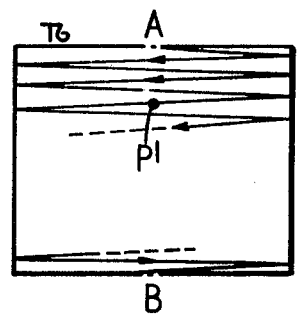

FIG. 1 is a diagrammatic representation of an arrangement for the application of the method of the invention; and FIG. 2 is a detail of a part of FIG. 1.

An emitter E directs a beam of electromagnetic radiation at the point P whose distance from the emitter E is to be determined. A reflected ray PR is received by a television camera, the ray passing through a point R which is fixed relative to E. The optical axis X of the camera is fixed relative to an axis ER, about which the emitter-camera assembly may be rotated, as well as relative to EP, but is not necessarily coplanar with ER and EP. The image of the point P is formed at P' in the plane $\pi$ where a photo sensitive screen is situated. P' will always be located on a straight line AB which is preferably the median of the screen, since the axes ER, EP, and X are fixed relative to one another, so that any point on the line EP will be projected on to the line AB. If the distance between E and P increases, the distance between P' and B also increases.

The emitter-camera assembly may be rotated about the axis ER to select different points on the surface for measurement, thus altering the position of the point P on the line EP and hence the position of P' on the line AB.

The screen $\pi$ is electronically scanned in the normal way and a single measurement of the time interval $\Delta t$ between P' and B allows calculation of the distance EP. The relation between $\Delta t$ and EP is represented by $\Delta t = f(EP)$ and, the function $f$ depending on the geometry of the system and the value of up may be expressed numerically by a digital signal SD or by an analogical signal SA due to a continuous conversion of the time $\Delta t$ into a continuously measurable potential $\Delta V$.

Thus, when the distance EP varies, the displacement on the screen of the point P' image of P is in the straight line AB. It can be arranged that the scanning of the screen can be perpendicular to this straight line, in which case a measurement of the time $\Delta t$ of scanning, between P' and B of the sensitive surface is taken. This is what is meant by line counting. Likewise it can be arranged that the direction of scanning coincides with this straight line AB. In this case the measurement of the time $\Delta t$ is made on this single straight line between the P' and the signal of the end of this line at B. This is what is meant by counting on a single line.

The above describes the determination of the profile of the intersection of the target surface with the plane generated by the radius EP as it rotates around ER. The profile of the whole target surface can be scanned by successively moving the whole of the transmitter-receiver device in steps along ER. This method is particularly advantageous for observing the upper surface of a blast furnace charge. On rotation of the emitter-camera assembly, the point P will move along the line on which said upper surface intersects with a plane perpendicular to the axis ER and containing the line EP. Thus it is possible to determine the profile of the upper surface of the blast furnace charge.

I claim:

1. A method of determining the distance of a point on a surface from a given point, comprising directing a beam of electromagnetic radiation from said given point along a given axis of emission onto said surface; receiving rays reflected from said surface, by means of a television camera having an objective lens having an optical axis which is fixed in relation to said axis of emission, whereby an image of said point on the surface is formed on said photosensitive screen; electronically scanning said photosensitive screen; measuring the time taken to scan between a given reference point and said image; and calculating said distance from said time.

2. A method as claimed in claim 1, wherein said distance is calculated from said time and from the geometry of the system.

3. A method as claimed in claim 1, further comprising generating an electrical signal representative of said time, and feeding said signal into an analog computer arranged to provide an output signal representing said distance.

4. A method as claimed in claim 1, wherein said objective lens has a solid angle of observation which presents, in a plane perpendicular to its optical axis, an elongate cross section whose greatest dimension lies in a plane parallel to the plane defined by said axis of emission and the optical center of said objective lens.

5. A method as claimed in claim 1, wherein the electromagnetic radiation is laser radiation.

6. A method as claimed in claim 5, wherein the electromagnetic radiation is pulsed laser radiation.

7. A method as claimed in claim 1, further comprising filtering the radiation received by the camera, by means of a highly selective interference filter, to eliminate radiation originating from the surface itself.

8. A method as claimed in claim 6, further comprising synchronizing the release of a pulse of radiation with the line synchronizing pulse of the scanning line on which time counting is to be carried out.

9. A method as claimed in claim 1, wherein said given reference point is the frame synchronization signal.